Dec. 16, 1969  R. C. NORRIE ET AL  3,484,852
DUAL-PURPOSE SINGLE-AXLE WHEELED VEHICLE FOR
USE IN TRACTOR-TRAILER RIGS
Filed Nov. 13, 1967  3 Sheets-Sheet 1
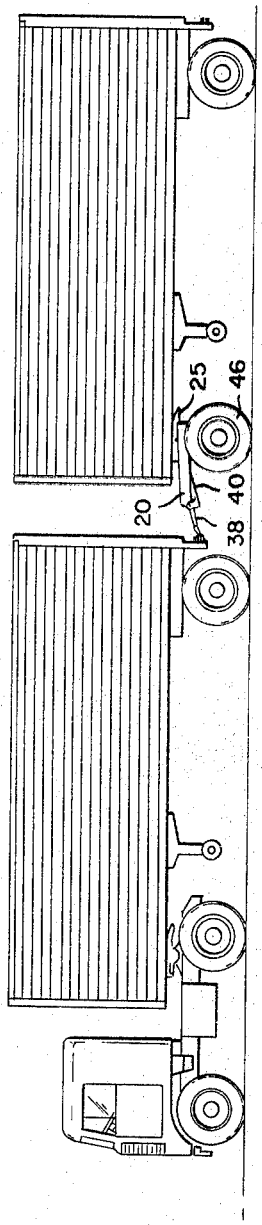
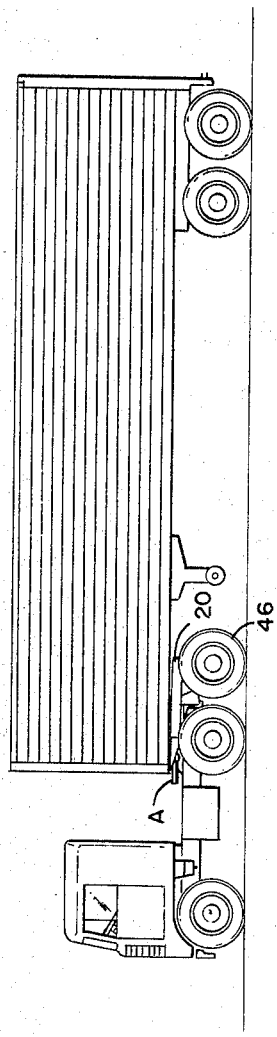
INVENTORS
ROBERT C. NORRIE
SYDNEY H. REYNOLDS
BY Seed, Berry & Dowrey
ATTORNEYS

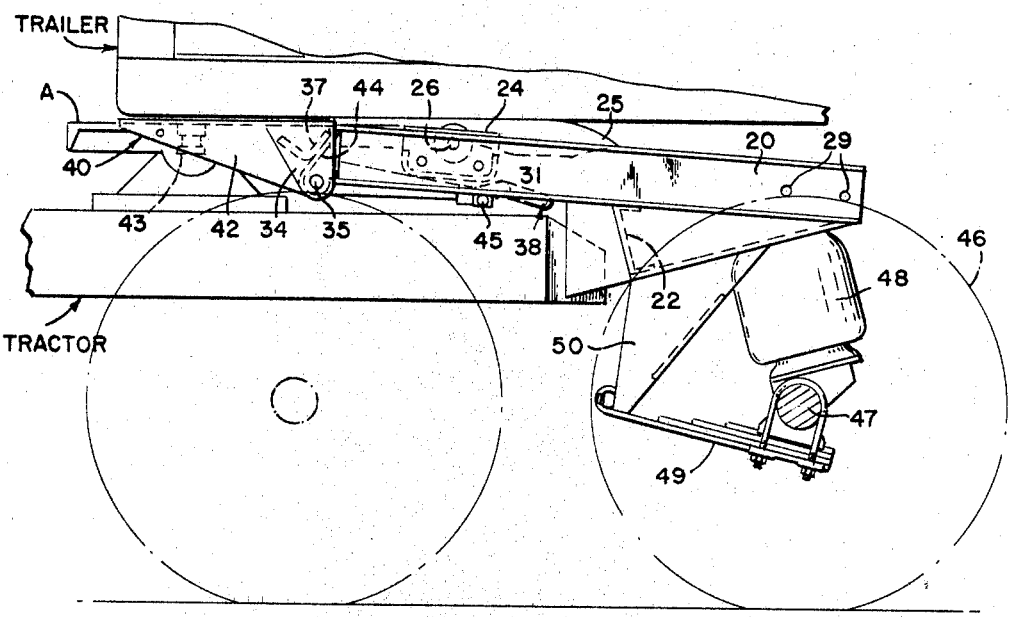
FIG__4
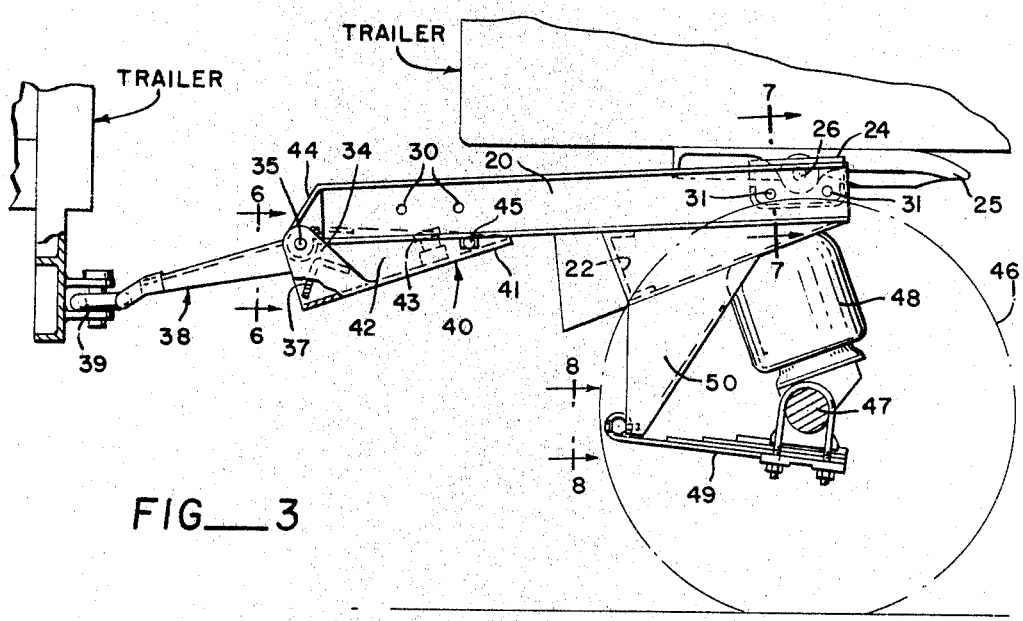
FIG__3

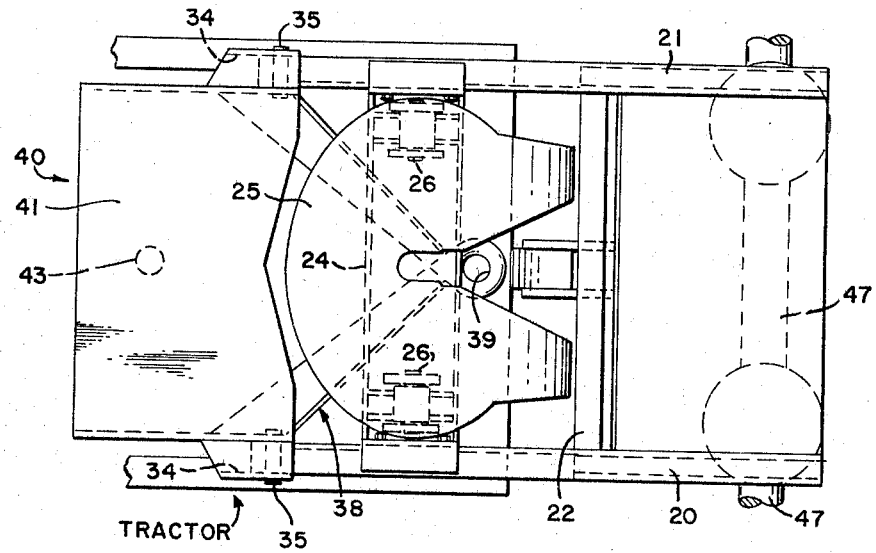
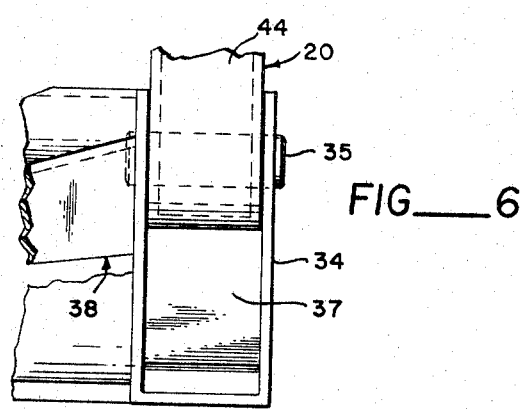
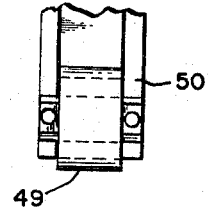
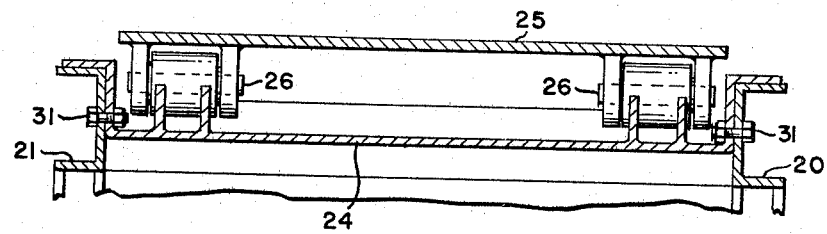

United States Patent Office 3,484,852
Patented Dec. 16, 1969

3,484,852
DUAL-PURPOSE SINGLE-AXLE WHEELED VEHICLE FOR USE IN TRACTOR-TRAILER RIGS
Robert C. Norrie and Sydney H. Reynolds, Seattle, Wash., assignors to Pacific Car and Foundry Company, Renton, Wash., a corporation of Washington
Filed Nov. 13, 1967, Ser. No. 682,125
Int. Cl. B60c *1/14;* B62d *53/08;* B63d *43/00*
U.S. Cl. 280—476                                9 Claims

ABSTRACT OF THE DISCLOSURE

A dual-purpose single-axle wheeled vehicle for use either as a trailer dolly in a tandem trailer rig or to convert a 2-axle tractor to a 3-axle tractor, characterized in that (1) a fifth-wheel functional as a hitch between the vehicle and the overlying front end of a trailer is shiftable longitudinally of the vehicle, and (2) two tongues one serving as a draw-bar and the other as a hitch functional to the fifth-wheel of a 2-axle tractor are formed upon the two ends of a beam carried for swing movement by the vehicle.

---

The invention relates to tractor-trailer rigs, particularly rigs having either a single 40 foot trailer or twin 27 foot trailers, the two shorter trailers, hooked in tandem, needing no more than a 2-axle truck-tractor to handle the same whereas the longer 40 foot trailer dictates a 3-axle tractor. The present trend is toward twin 27 foot trailers, which have an increased loading capacity and greater flexibility. This type of rig is continually finding acceptance in more and more states. However, for as long as there are indivisible loads necessitating a longer single trailer, the 40 foot trailer is here to stay. The problem is that mixed 2 and 3-axle tractor fleets do not provide maximum utilization. This has been recognized and as an answer thereto there have been devised several converters which can be attached to and detached from the rear of a 2-axle tractor for converting the same to a 3-axle tractor. These converters negate the tractor's existing fifth-wheel, substituting its own in a position that arranges the load suitably between the tractor's live axle and an added dead axle which the converter provides. These 3-axle tractors with a live/dead tandem at the rear are of course not universally acceptable because of the traction limitation but they do satisfy a very large market.

Converter vehicles are of two types, those that are applicable only as a rear-end attachment for a 2-axle tractor, hence can be said to be only single-purpose, and those that are double purpose in that they admit of being alternatively used either as a converter for the 2-axle tractor or as a dolly giving support to the front end of the trailing trailer in a twin trailer rig. Double-purpose converters employ relocatable fifth-wheels. Most, when used as a tractor converter, fasten to the tractor's existing fifth-wheel and are located by either the frame itself or a rear crossmember attached guide. Conventional brake gear is provided for the ground wheels, and most carry a ground-engaging foot for use when the converter is standing idle. The double-purpose type of converter vehicle obviously has much greater usefulness to a mixed fleet operator. It precludes the converter equipment laying idle in the yard during periods when the operator's requirements are for an excess of "double-bottom" rigs.

The present invention has for its object the provision of a converter of the double-purpose type which is more advantageous than the double-purpose converters heretofore available. With this and more particular objects and advantages in view and which will appear and be understood in the course of the following description and claims, the invention consists in the novel construction and in the adaptation and combination of parts hereinafter described and claimed.

In the accompanying drawings:

FIGURES 1 and 2 are side elevational views of the two types of tractor-trailer rigs to which the introductory matter refers, and incorporating therein an illustration of a preferred embodiment of the present invention in the performance of its intended function.

FIGS. 3 and 4 are each a side elevational view thereof drawn to an enlarged scale showing respectively, the dolly application and the tractor converter application, the two trailers of the double-bottom rig being shown fragmentarily in the former view and the tractor and associated single trailer being shown fragmentarily in the latter view.

FIG. 5 is a top plan view of the FIG. 4 application.

FIG. 6 is a fragmentary transverse vertical sectional view drawn to an enlarged scale on line 6—6 of FIG. 3.

FIG. 7 is an enlarged-scale fragmentary transverse vertical sectional view on line 7—7 of FIG. 3; and FIG. 8 is a fragmentary enlarged-scale view detailing the frame-end mounting for radius arms which restrain the axle of the converter/dolly unit to vertical travel in a prescribed path, the vantage point from which the mounting is viewed being shown at 8—8 in FIG. 4.

Referring to said drawings, a main frame for the converter/dolly is comprised of side rails 20 and 21 extending longitudinally in spaced paralleling relation. A suitable cross-section 22 is provided. The cross connection is characteristized in that it lies a material distance to the rear of the frontal extremity of the frame, giving to the frame a deeply indented furcate configuration at the front end, and in the horizontal plane of the rails leaves the space between the same unobstructed throughout the length of the frame.

Said unobstructed space accommodates fore-and-aft shift movements of a sliding bracket 24 which employs the upper edges of the rails as a slide-way and functions as a mounting for a fifth-wheel 25. Co-axial pivot pins for the rocking movement of the fifth-wheel are denoted by 26. Vertical end walls of said shiftable bracket each have a pair of holes (see FIG. 7) drilled through the same. Corresponding therewith and drilled through each of the frame rails are two sets of holes 29—29 and 30—30 placed so that the one set will register with the holes of the bracket when the bracket is shifted to a prescribed rear position and the other set will register with said holes when the bracket is shifted to a prescribed front position. The bracket is placed in the rear position when performing its dolly function and in the front position when performing its converter function. Pins 31 are applied through the registering holes to releasably lock the sliding bracket in a selected said position.

The furcate opening at the front end of the main frame accommodates a swing-frame which is hinged intermediate its ends to the front end of the main frame for swing movement through an approximate 180° arc about a transverse horizontal axis. To provide the hinge attachment the front ends of the frame rails are formed with bosses. Forks 34 presented by the swing-frame at each side thereof straddle the bossed ends and connect therewith by traversing pivot pins 35.

The tongue 38 which is presented upon one end of the swing-frame serves as a draw-bar and has the usual terminal eye 39. The swing-frame is swung so that this tongue projects forwardly—to be attached by its eye to the lead trailer of a double bottom rig—when the unit is to be applied as a dolly. As above stated, the sliding bracket then occupies the rear position in which it is illustrated in FIG. 1. When such bracket is to be shifted forwardly into the position in which it is illustrated in FIG. 2, i.e. for use in converting a 2-axle tractor to a 3-axle tractor, the swing-frame is first swung so that its other tongue 40 extends forwardly from the main frame. In this position the draw-bar tucks under the sliding bracket.

Tongue 40 presents a deck section 41 having a flat face which lies uppermost when the tongue extends forwardly. Ribs 42 reinforce the deck along each side edge of the tongue, and there is provided a king-pin 43 depending from the underside of the deck in a position spaced central to the width. The king-pin operates as the functioning complement of a standard commercial fifth-wheel denoted by A in FIG. 2.

As viewed from the vantage point of FIGS. 1 and 2 the motion of the swing-frame is clockwise when bringing the tongue 40 into a forwardly pointing position and counterclockwise when bringing the tongue 38 into such forwardly pointing position. To perform the function of a stop for said clockwise swing a section 37 of angle iron stock is welded in the throat of each fork 34, the stop coming to rest against end walls 44 of the frame rails.

For the counter-clockwise swing a suitable means such as a manually releasable pin 45 is provided to hold the swing-frame in a localized swung position while hooking up twin trailers in what is commonly termed a double-bottom rig. The localizing action permits one-man operation. In the absence thereof two men would be required in order to preclude jackknifing which is, of course, no problem after the draw-bar has been attached to the leading trailer and the load of the trailing trailer brought onto the fifth-wheel 25. It will be understood that the pin 45 can be either inserted manually or can be manually set so as to catch automatically when the pin and a mating hole are swung into registration.

Ground wheels 46 for the converter/dolly unit are carried by a single dead axle 47 constrained to vertical movement in a path which is proximal to a perpendicular dropped from the rocker axis of the fifth-wheel 25 when said fifth-wheel occupies its rear (dolly) position.

The converter/dolly unit lends itself to use with sundry types of suspensions. When used as a trailer dolly an orthodox leaf spring suspension would be satisfactory. However, considering its application as an articulated converter the use of an air-spring suspension is particularly advantageous. In the converter usage there are numerous occasions of tending to unload the converter axle when articulation forces the trailer nose and load onto the tractor fifth wheel via plate 41. Such may occur during highway travel and is also likely to occur in a loading dock. An air suspension ideally handles such unloading action by reason of its ability to expand and elevate the converter frame with fifth wheel and restore its portion of the trailer load to the converter axle. Air springs also enable a variety of tractor fifth-wheel heights to be matched with one spring assembly. For height control the design of the air spring suspension can be either automatic or manual.

With the air springs, denoted by 48, the axle can be restrained in many ways. We have elected to show leaf spring radius arms 49 which are simple and also ideal from the standpoint of torsional resistance. Clamped at the aft or axle end and pivoting from elastomer mountings at the forward or frame end, the use of leaf- springs as radius arms producers good side thrust characteristics.

The manner of use of the described converter/dolly unit will be apparent from the foregoing description and the illustration (FIGS. 1 and 2) of the unit in the performance of its two functions.

It is here pointed out that the cross-connection 22 is made to interfit with the rear end of the 2-axle tractor, the interfit permitting relative vertical motion but containing the mating parts against lateral displacement.

The embodiments of the invention in which an exclusive property or privilege is claimed are defined as follows:

1. A dual-purpose single-axle wheeled vehicle for use either as a trailer dolly in a tandem trailer rig or to convert to a 3-axle tractor a 2-axle tractor which is conventionally equipped with a fifth-wheel, said dual-purpose vehicle comprising, in combination with the single axle and a main frame from which said axle is suspended: a fifth-wheel applicable as a hitch between the wheeled vehicle and the overlying front end of a trailer and supported by the main frame for shifting movement longitudinally of the frame into either an aft position used when the vehicle is performing its dolly function or a front position used when the vehicle is performing its converter function, and two tongues mounted from the main frame for swing movement about a transverse horizontal axis permitting either of said tongues, selectively, to be pointed forwardly from the swing axis, one of said tongues being swung into its forwardly pointing position when the vehicle is performing its converter function and being characterized in that there is provided thereon a king-pin which then extends downwardly and is functional to the fifth-wheel of the 2-axle tractor, the other of said tongues being pointed forward when the wheeled vehicle is performing its dolly function, serving as a draw-bar and being provided upon the free end with a hitch device functional to the front-running trailer of said tandem-trailer hook-up.

2. A vehicle as claimed in claim 1 in which the suspension for the axle comprises: an air spring yieldingly resisting vertical movement of the axle relative to the main frame, and means constraining said vertical movement to a prescribed path.

3. A vehicle as claimed in claim 2 in which the movement-contraining means comprises leaf-spring radius arms.

4. A vehicle as claimed in claim 1, means being provided upon the vehicle engageable with a means on the 2-axle tractor permitting relative vertical motion as between the vehicle and the tractor but precluding lateral displacement.

5. A vehicle as claimed in claim 1 in which the fifth-wheel rocks about a transverse horizontal axis upon a bracket which is slidable on the main frame for giving the fifth-wheel its shift movement, the location occupied by said bracket to place the fifth-wheel in its aft position positioning the rocker axis approximately on a perpendicular raised from the vehicle's axle, the location occupied by said bracket to place the fifth-wheel in its front position positioning the rocker axis approximately 36″ forward from said perpendicular, means being provided for releasably locking the sliding bracket in either of said two locations.

6. A vehicle as claimed in claim 5 in which rails serving as longitudinal principals for the main frame produce a slide-way for the bracket.

7. A vehicle as claimed in claim 1 in which the tongues are formed as oppositely extending ends of a swing-frame common to both.

8. A vehicle as claimed in claim 7 in which the tongue which serves as a draw-bar tucks under the vehicle's fifth-wheel when the other tongue is pointed forward.

9. A vehicle as claimed in claim 1 in which the king-pin depends from the underside of a plate having a flat upper face, a stop means being provided limiting the swing motion of said tongue from which the king-pin depends and by said limitation positioning said face approximately flush with the facing surface of the vehicle's fifth-wheel when the king-pin is engaged with the fifth-wheel of the 2-axle tractor.

References Cited

UNITED STATES PATENTS

| | | | |
|---|---|---|---|
| 2,872,213 | 2/1959 | Hosford | 280—415 |
| 3,203,711 | 8/1965 | Chew | 280—423 X |
| 3,246,912 | 4/1966 | Cunha | 280—407 |
| 3,312,479 | 4/1967 | Cunha | 280—407 |
| 3,347,563 | 10/1967 | Harbers | 280—415 X |
| 3,413,015 | 11/1968 | Fontaine | 280—415 |
| 3,421,778 | 1/1969 | Barker et al. | 280—476 |

FOREIGN PATENTS 39,811  9/1965  Germany.

LEO FRIAGLIA, Primary Examiner

U.S. Cl. X.R.

280—415, 417